United States Patent [19]

Eckels et al.

[11] 4,356,700
[45] Nov. 2, 1982

[54] LIQUID COOLANT TRANSFER DEVICE

[75] Inventors: Phillip W. Eckels, Penn Hills Township, Allegheny County; Donald C. Litz, Murrysville; Adolphus Patterson, Wilkinsburg, all of Pa.

[73] Assignee: Westinghouse Electric Corp., Pittsburgh, Pa.

[21] Appl. No.: 255,907

[22] Filed: Apr. 20, 1981

[51] Int. Cl.³ .............................................. F17C 7/02
[52] U.S. Cl. ........................................ 62/55; 62/505; 277/203; 277/215; 310/54; 310/64
[58] Field of Search ...................... 62/55, 505; 310/54, 310/64; 165/86; 277/203, 215

[56] References Cited

U.S. PATENT DOCUMENTS

| 2,973,629 | 3/1961 | Lady | 62/55 |
| 3,991,588 | 11/1976 | Laskaris | 62/55 |
| 4,035,678 | 7/1977 | Lambrecht et al. | 62/505 |
| 4,048,529 | 9/1961 | Pomeroy et al. | 62/505 |

OTHER PUBLICATIONS

"Wildback Seals-A Simple Theory And Design Method And The Main Practical Limitations", Crease, A. B., 7th International Conference on Fluid Sealing, Sep. 24-26th, 1975.

Primary Examiner—Ronald C. Capossela
Attorney, Agent, or Firm—William D. Lanyi

[57] ABSTRACT

A cryogenic liquid coolant transfer device enhances flow of a liquified gas in the inboard direction by the incorporation of a threaded insert in the rotating inlet pipe of a superconducting rotor. The threads of the device also facilitate the reverse flow of liquid helium back into a stationary supply tube during fault conditions. The objective of the insert, during both normal and abnormal conditions, is to inhibit the flow of liquid coolant into the clearance gap that exists between rotating and stationary parts of the liquified gas transfer system.

18 Claims, 4 Drawing Figures

LIQUID COOLANT TRANSFER DEVICE

BACKGROUND AND SUMMARY OF THE INVENTION

The present invention relates to the transfer of a liquid coolant from a stationary member to a rotating apparatus and, more particularly, to the transfer of liquid helium from a stationary cylinder to a generator rotor.

In recent years, the science of cryogenics has expanded dramatically in the field of electrical power generation. Electrical generators are now being developed that have virtually eliminated the losses that are inherent when an electric current is transported through a resistive conductor. This progress has been made possible through the supercooling of the field windings of the generator's rotor. When these conductors are cooled to superconducting temperatures they exhibit a lack of resistance and allow transportation of field current with virtually no losses.

This supercooling of the generator rotor is typically accomplished by submersing the rotor's field coils in a pool of liquid helium which boils and thereby reduces the winding to superconducting temperature. Since the rotor, spinning at high speed, requires a constant replenishment of the liquid helium which has boiled off, a method of efficiently transferring liquid helium from stationary equipment to the spinning rotor is necessary. Typically this transfer is accomplished by disposing a stationary supply tube coaxially within a rotating inlet pipe which is connected to the rotor. This method creates a cylindrically shaped clearance gap between the tube and the pipe which is subjected to extreme temperature gradients across its length. These gradients can cause rapid oscillations between the liquid and gaseous states of the helium and it is to the elimination of these oscillations which the present invention is directed.

The transfer system disclosed herein provides a threaded insert in the rotating inlet pipe which, in response to the pipe's rotation, causes the liquid helium to be pushed inward towards the rotor's helium reservoir and, thus, away from the cylindrically shaped clearance gap which is between the rotating pipe and the stationary supply tube. This threaded member and the selective placement thereof not only drives the helium toward the reservoir during normal operation but provides the additional beneficial function of facilitating a reverse flow of helium into the stationary tube during fault conditions.

The problem of liquid coolant entering the cylindrically shaped clearance gap is addressed in U.S. Pat. No. 3,991,588, issued to Evangelos T. Laskaris on Nov. 16, 1976. The Laskaris device uses a step in the inside diameter of the rotatable supply pipe which is intended to permit only gaseous helium to enter the clearance gap.

BRIEF DESCRIPTION OF THE DRAWINGS

The present invention will be more fully understood from a reading of the following description of the preferred embodiment in conjunction with the figures, in which.

DESCRIPTION OF THE PREFERRED EMBODIMENT

Figure 1:
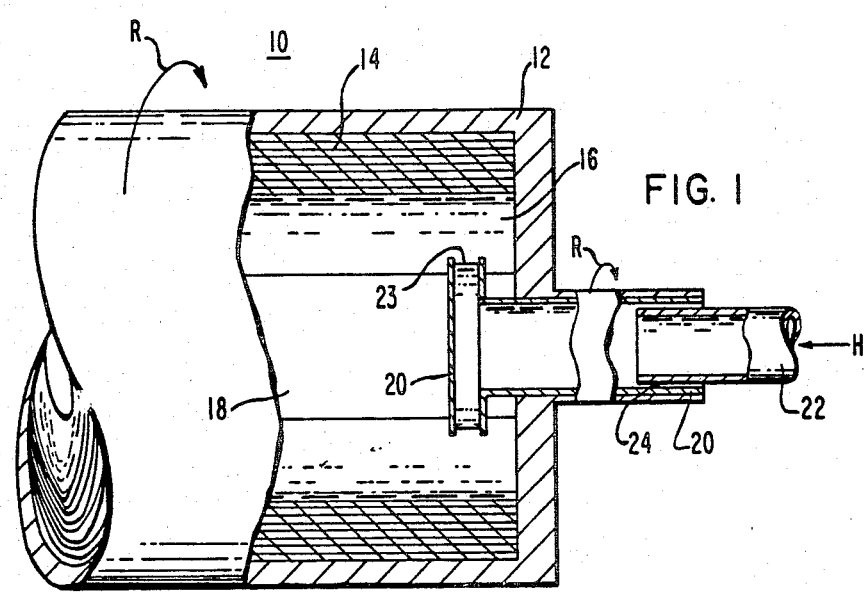
FIG. 1 shows an exemplary view of a typical superconducting rotor.

In FIG. 1, a sectioned view of an exemplary superconducting rotor is shown. The rotor 10 has a support structure 12 which contains the rotor's field coil winding 14. The field coil 14 is submerged in a liquid helium pool 16 which assumes an annular shape due to the rapid rotation (shown by the directional arrows R) of the rotor structure 12. This rotation, in forming the annular helium pool 16, also creates a cylindrically shaped core 18 of gaseous helium. The relative sizes of the helium pool 16 and gaseous core 18 depend on external factors such as the temperature and pressures of the entire rotor system.

A supply pipe 20 is connected to the rotor 10 coaxial to the axis of rotation of the rotor 10 and extends axially therefrom. The supply pipe 20 is shown in FIG. 1 as having a T-shaped inner terminus but it should be understood that the particular shape of the inboard end of the supply pipe is not crucial to the operation of the present invention and other types of vapor traps could be used without deleterious effect on the transfer system disclosed herein. A differently shaped inboard end of the supply pipe is disclosed in U.S. Pat. No. 4,048,529, issued to Bruce D. Pomeroy on Sept. 13, 1977. It employs an S-shaped vapor trap instead of the T-shaped vapor trap as depicted in FIG. 1.

FIG. 1 also shows a stationary tube 22 through which liquid helium is supplied to the rotor 10 (in the direction of arrow H). Since the tube 22 is stationary and the supply pipe 20 is rotating, it should be obvious to those skilled in the art that these two coaxial cylindrical members cannot be permitted to contact each other. Therefore, a clearance 24 is provided between them. This clearance 24 has a cylindrical shape and extends from the inboard end of the stationary tube 22 to the outboard end of the rotating pipe 20. Between these two termini of the clearance 24, a severe temperature gradient exists during operation of the rotor. In some applications, the clearance 24 is only 3 inches long and varies in temperature from approximately 4° Kelvin at its inboard end to 300° Kelvin (essentially room temperature) at its outboard end. It should be obvious that this extreme temperature gradient transfers heat into the cold space, decreases the efficiency of the coolant transfer and the machine's operation and can create a condition, wherein helium would be in a liquid state at one end of the clearance gap 24 and gaseous at the other, which is highly susceptible to thermal oscillations therebetween if helium is permitted to enter this gap 24. However it is desirable to have the inboard terminus of the clearance gap 24 submerged under liquid because it is well known to those skilled in the art that this selected submergence tends to reduce oscillation intensity. Therefore, it should be apparent that the operational efficiency of a superconducting rotor can be improved if the inboard terminus of the clearance gap 24 can be submerged under liquid coolant while the outboard majority of the gap 24 is kept free of liquid coolant.

Figure 2:
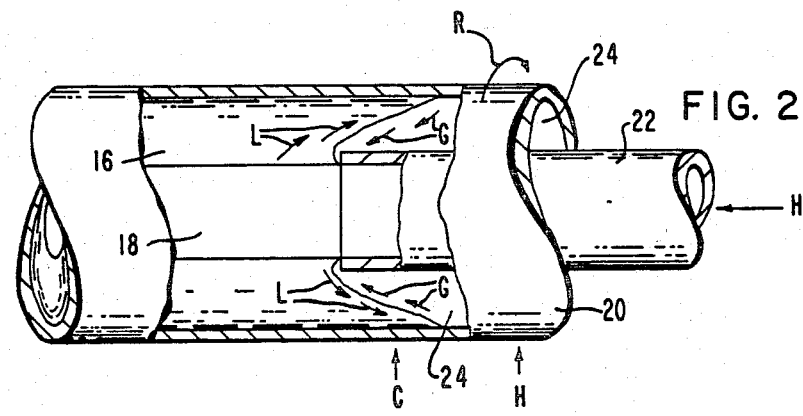
FIG. 2 illustrates the behavior of helium in the area proximate the clearance gap between the rotating and stationary members of a superconducting rotor.

FIG. 2 illustrates the above-mentioned condition. The rotating pipe 20 is partially filled with liquid helium 16 with a vapor core located at its center because of the rotation shown in the direction R. The liquid helium enters and flows through the stationary tube 22 in the direction shown by the arrow H. As it leaves the stationary pipe 22, the liquid helium 16 assumes the annular shape described above. If no further provisions are made, the liquid helium will begin to migrate into the gap 24 as shown by the directional arrows L. As this migration progresses, the helium leaves the cold zone C where it is approximately 4° Kelvin and liquid and moves toward the hot zone H where its temperature rises to approximately 300° Kelvin and the helium gasifies. As the gaseous helium circulates back toward the cold zone C (shown by directional arrows G), it again shrinks in volume. Under certain conditions, these changes in state can cause rapid thermal oscillations. It is the prevention of these oscillations to which one of the objectives of the present invention is directed. It is also evident that, as liquid coolant 16 migrates into the clearance gap 24, it cools the gap 24 and moves the cold zone C toward the hot zone H. This reduces the distance between the 4° Kelvin and 300° Kelvin zones and proportionately increases the temperature gradient and its tendency to increase the heat leak into the cold space which reduces the efficiency of the machine and exacerbates the oscillation problem described above. This invention also has as its objective the prevention of this decrease in the efficiency of liquid coolant transfer.

Although the liquid helium can flow into the clearance gap during normal operation, this problem becomes most severe during fault conditions where liquid helium is caused to reverse its conventional flow and move from the rotor's center toward the stationary tube at a very high velocity. Referring once again to FIG. 1, the rotor system is shown in a stable condition. However, during fault conditions a rapid helium boil off can exist which raises the pressure of the gaseous core 18 and the liquid helium pool 16. This pressure can reach 4 atmospheres at the mouths 23 of the inboard end of the supply pipe 20. It should be obvious that when the pressure on the liquid helium pool 16 exceeds that of the stationary tube 22, the liquid helium will rush through the rotating pipe 20 towards the tube 22.

Figure 3:
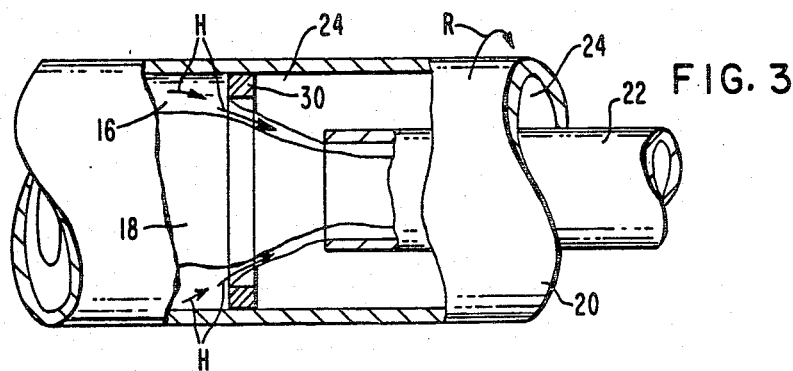
FIG. 3 depicts the experimental results of the insertion of a ring into the rotating supply pipe of a superconducting rotor.

During fault conditions it is important to have the liquid helium exit the rotor through the stationary tube 22 and not into the clearance gap 24 for the reasons described above. It has been discovered experimentally that this reverse flow can be significantly enhanced by the inclusion of a radius-reducing device in the rotating pipe. This experiment is depicted schematically in FIG. 3 where a rotating pipe 20 is disposed coaxially about a stationary tube 22 and liquid helium 16 is caused to flow toward the tube 22. As described above, the rotation R causes the liquid helium 16 to form an annulus with a gaseous core 18. It was discovered that a ring-shaped insert 30 disposed within the pipe 20 greatly facilitated the flow of the liquid helium into the stationary tube 22 rather than into the clearance gap 24.

Figure 4:
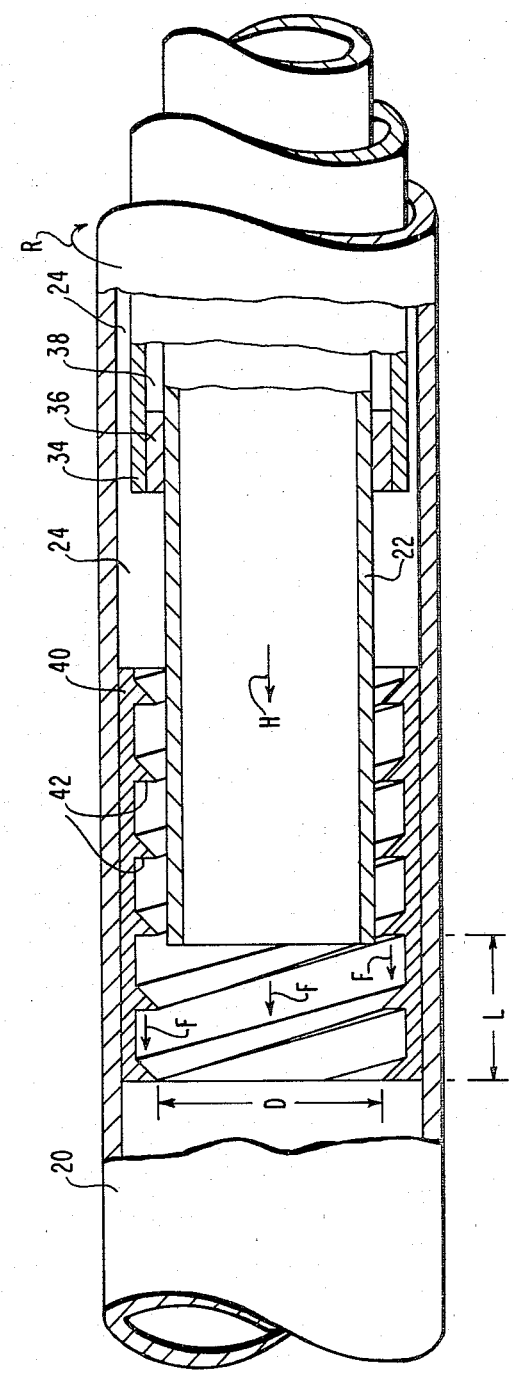
FIG. 4 is a detailed sectioned view of the liquid helium transfer device of the present invention.

In order to take advantage of the above-mentioned reverse-flow behavior and to aid the conventional forward-flow during normal, non-fault conditions, the transfer device is equipped with a threaded insert as shown in FIG. 4. FIG. 4 shows a detailed section view of the preferred embodiment of the present invention. The rotating supply pipe 20, as described above and shown in the other figures, is disposed coaxially about the stationary tube 22. The stationary tube 22 is connected to and disposed within another tube 34 in order to form a vacuum jacket 38 in conjunction with a ring 36. This jacket 38 is used to further insulate the stationary tube 22. A clearance gap 24 exists around the outer stationary tube 34 and around the inner stationary tube 22 where it extends beyond the vacuum jacket 38 and outer stationary tube 34.

Connected to the rotating supply pipe 20 and disposed about the inboard end of the stationary tube 22 is a cylindrical threaded insert 40. This insert 40 has threads 42 which run in a direction that, in response with the direction of rotation R, creates a force F on the liquid helium that moves it away from the clearance gap 24 and towards the liquid helium reservoir of the rotor.

It should be apparent that the threads 42 of the insert 40 perform two beneficial functions. First, during normal operations when helium is flowing in the direction of arrow H, they act as an auger which moves the annular body of liquid helium (not shown in FIG. 4) away from the clearance gap 24. Secondly, during abnormal fault conditions as described above when the liquid helium is moving from the reservoir toward the stationary tube 22, the threads perform the directional function of the ring (reference numeral 30 in FIG. 3) to facilitate the liquid helium's travel into the tube 22 and not the clearance gap 24. The relationship of the inside diameter of the threads 42 (D in FIG. 4) to the axial extension (L in FIG. 4) of the insert 40 in the inboard direction past the inboard terminus of the stationary tube 22 must be specifically determined for each particular application of the present invention. This relationship is a function of the flow characteristics of the liquid coolant and the inward driving force determined to be a requirement for the application.

Thus, it should be apparent that the present invention provides a device that performs three important functions necessary for the proper operation of superconducting rotors. During normal operation it aids the conventional flow of liquid cryogen toward the liqiud helium pool and, during abnormal fault conditions, it induces a streamlined reverse flow into the stationary supply tube. It also facilitates the submergence of the inboard end of the clearance gap under liquid coolant while inhibiting the flow of liquid coolant into the outboard majority of the clearance gap by forming a labyrinth seal between the inside diameter of the threads 42 and the outside diameter of the stationary tube 22. During either condition, the present invention hinders the helium's unrestrained access to the clearance gap which lies between the rotating and stationary members.

It should be further apparent that, although the present invention has been described in considerable detail, it should not be considered to be so limited. For example, the insert has been shown in FIG. 4 to have dual buttress threads. The threads may be of various types selected to perform the above-described functions. Furthermore, in FIG. 4, the insert has been shown in a size and position disposition relative to the end of the stationary tube depicted by the dimensions D and L. This relative association is not fixed but will vary within the limits implicitly determined by the intended functions of the present invention described above and according to the specific conditions of each particular application.

What we claim is:

1. A fluid transfer coupling for introducing a liquid cryogen into a rotating machine, comprising:
   a rotatable pipe which is coaxial with and connected to said rotating machine;
   a stationary tube which is coaxial with said rotatable pipe and extends into said rotatable pipe; and threaded means for causing said liquid cryogen to flow axially away from said stationary tube in response to rotation of said rotating machine, said threaded means being disposed in and connected to said rotatable pipe.

2. The coupling of claim 1, wherein:
said threaded means is a dual buttress thread on the inside diameter of said rotatable pipe.

3. The coupling of claim 1, wherein:
said stationary tube extends into said threaded means.

4. The coupling of claim 1, wherein:
said stationary tube comprises a first portion and a second portion, said first portion being larger in outside diameter than said second portion, and said second portion extending into said threaded means.

5. An apparatus comprising:
a rotatable pipe having an inlet end and an outlet end, said rotatable pipe being rotatable about its central axis; and
a stationary tube inserted into said inlet end a preselected distance, said stationary tube being in fluid communication with said rotatable pipe;
an internal thread disposed on the inside diameter of said rotatable pipe, said thread exerting an axial force, in response to rotation of said rotatable pipe, toward said outlet end on a liquid cryogen introduced into said inlet end through said stationary tube.

6. The apparatus of claim 5, wherein:
said stationary tube comprises a first portion and a second portion, said first portion extending past said thread and being smaller in outside diameter than said second portion.

7. The apparatus of claim 6, wherein:
said outside diameter of said second part is larger than the minimum diameter of said thread.

8. A liquid-cooled generator rotor, comprising:
a refrigerant reservoir disposed within said rotor;
a rotatable pipe, said rotatable pipe being connected to said rotor and having a first and a second end, said first end being in fluid communication with said reservoir and said second end extending away from said reservoir, said rotatable pipe being coaxial with said rotor;
stationary means for introducing a liquid refrigerant into said second end of said rotatable pipe; and
threaded means, connected to and disposed within said rotatable pipe, for moving said liquid refrigerant toward said first end of said rotatable pipe, said threaded means being activated by rotation of said rotor.

9. The rotor of claim 8, wherein:
said liquid refrigerant is a liquified gas.

10. A method for introducing a liquid refrigerant into a rotating device, comprising:
disposing a pipe within said rotor, said tube being coaxial with and connected to said rotor;
positioning a stationary tube coaxial with and extending into said pipe; and
connecting a threaded device to the inside surface of said tube, said threaded device being configured to pump said liquid refrigerant in a direction away from said pipe in response to rotation of said rotor.

11. The method of claim 10, further comprising:
forming a labyrinth seal between said stationary tube and said threaded device.

12. A transfer device for introducing a liquid coolant into a rotating apparatus, comprising:
a pipe connected to and coaxial with said rotating apparatus;
a stationary means for introducing said liquid coolant into said pipe, said stationary means being disposed into said pipe a preselected distance; and
means for reducing the effective inside diameter of said pipe, said reducing means being disposed proximate said introducing means and connected to said pipe.

13. The device of claim 12, wherein:
said reducing means is a raised protrusion extending radially inward from the inside surface of said tube.

14. The device of claim 13, wherein:
said raised protrusion is a spiral thread connected to said tube.

15. The device of claim 12, wherein:
said liquid coolant is a liquified gas.

16. The device of claim 15, wherein:
said liquified gas is helium.

17. The device of claim 12, wherein:
said reducing means extends inboard from an inboard terminus of said stationary means for a preselected distance.

18. The device of claim 12, wherein:
said reducing means extends outboard from an inboard terminus of said stationary means for a preselected distance.

* * * * *